(12) United States Patent
Borapura et al.

(10) Patent No.: US 8,584,209 B1
(45) Date of Patent: Nov. 12, 2013

(54) AUTHENTICATION USING A PROXY NETWORK NODE

(75) Inventors: Ramesh Borapura, Bangalore (IN);
Murari Bhattacharyya, Kolkata (IN);
Sachin Bansal, Fremont, CA (US);
Manjunath Jagannatharao, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 329 days.

(21) Appl. No.: 12/959,770

(22) Filed: Dec. 3, 2010

(51) Int. Cl.
*G06F 7/04* (2006.01)
(52) U.S. Cl.
USPC .................................. 726/4; 726/12; 370/254
(58) Field of Classification Search
USPC ........................................ 726/4, 12; 370/254
See application file for complete search history.

(56) References Cited

U.S. PATENT DOCUMENTS

| | | | | |
|---|---|---|---|---|
| 7,447,166 | B1* | 11/2008 | Kaluve et al. | 370/254 |
| 2006/0114872 | A1* | 6/2006 | Hamada | 370/338 |
| 2006/0245373 | A1* | 11/2006 | Bajic | 370/254 |

OTHER PUBLICATIONS

LAN/MAN Standards Committee, "Port-Based Network Access Control". IEEE Std 802.1X™—2004, Dec. 13, 2004, 179 pages.

\* cited by examiner

*Primary Examiner* — Harunur Rashid
(74) *Attorney, Agent, or Firm* — Harrity & Harrity, LLP

(57) ABSTRACT

A method includes detecting a presence of a device on a network associated with a node, where the node is not connected to an authentication server and is configured to communicate with the device using a data link layer authentication protocol; communicating, with another node, using a data link layer tunneling protocol, to authenticate the device as a result of detecting the presence of the device, where the other node communicates with the authentication server, using a network layer authentication protocol, that enables the other node to receive an authentication notification associated with the device; receiving, from the other node, the authentication notification that indicates that the device has been authenticated, where the authentication notification is received using the data link layer tunneling protocol; and sending, to the device, an indication that the device is authorized to communicate with the network, where the sending includes establishing an authentication session that enables the device to communicate with the network.

23 Claims, 5 Drawing Sheets

AUTHENTICATION USING A PROXY NETWORK NODE

BACKGROUND

Computing and communication networks typically include network devices, such as routers, firewalls, switches or gateways, which transfer or switch data, such as packets, from one or more sources to one or more destinations. Network devices may operate on the packets as the packets traverse the network, such as by forwarding or filtering the packet-based network traffic. Packets may be temporarily stored in queues as packets are moved through the network devices.

Network devices may authenticate destination devices by communicating with an authentication server and may authorize the destination devices to communicate with the network based on a successful authentication. Unfortunately, some network devices (e.g., such as a switch configured as a layer-two switch) may not be able to communicate with the authentication server. Network devices that are unable to communicate with the authentication server may be unable to authenticate destination devices with which the network devices are interconnected.

SUMMARY

According to one aspect, a method may be performed by a network node. The method may include detecting, by the network node, a presence of a client device on a network associated with the network node, where the network node may not be connected to an authentication server and may be configured to communicate with the client device using a data link layer authentication protocol. The method may also include communicating, by the network node and with another network node using a data link layer tunneling protocol, to authenticate the client device as a result of detecting the presence of the client device, where the other network node may communicate with the authentication server, using a network layer authentication protocol, that enables the other network node to receive an authentication notification associated with the client device. The method may further include receiving, by the network node and from the other network node, the authentication notification that indicates that the client device has been authenticated, where the authentication notification may be received using the data link layer tunneling protocol; and sending, by the network node and to the client device, an indication that the client device is authorized to communicate with the network, where the sending may include establishing an authentication session that enables the client device to communicate with the network.

According to another aspect, a network node may include a processor to receive, from a client device, an access request via a first port that drops traffic that is not associated with an authentication operation. The processor may output, to another network node and in response to the access request, an authentication request via a second port and via a data link layer tunnel, where the other network node may communicate with an authentication server, using a network layer authentication protocol, to authenticate the client device based on information associated with the client device. The processor may receive, from the other network node and via the second port and the data link layer tunnel, a notification that the client device is authenticated; and establish an authentication session with the client device based on the notification, where establishing the authentication session may include setting the first port to an authorized state that enables the network node to process traffic that is not associated with the authentication operation.

According to still another aspect, a method may include receiving, by a network node, a packet from a client device; determining, by the network node and based on the packet, that the client device is connected to a network associated with the network node; and obtaining, by the network node, information associated with the client device. The method may also include encapsulating, by the network node, the information associated with the client device in one or more packets associated with a data link layer tunneling protocol; and outputting, by the network node and to another network node, a request to, authenticate the client device, that includes the one or more packets within which the information associated with the client device is encapsulated, where the information associated with the client device may permit the other network node to communicate with an authentication server, via a network layer protocol, to authenticate the client device. The method may further include receiving, by the network node and from the other network node, a notification, where the notification is received based on the data link layer tunneling protocol; sending, by the network node and to the client device, an indication that the client device is authorized to communicate with the network when the notification indicates that the client device has been authenticated; and sending, by the network node and to the client device, an indication that the client device is not authorized to communicate with the network when the notification indicates that the client device has not been authenticated.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
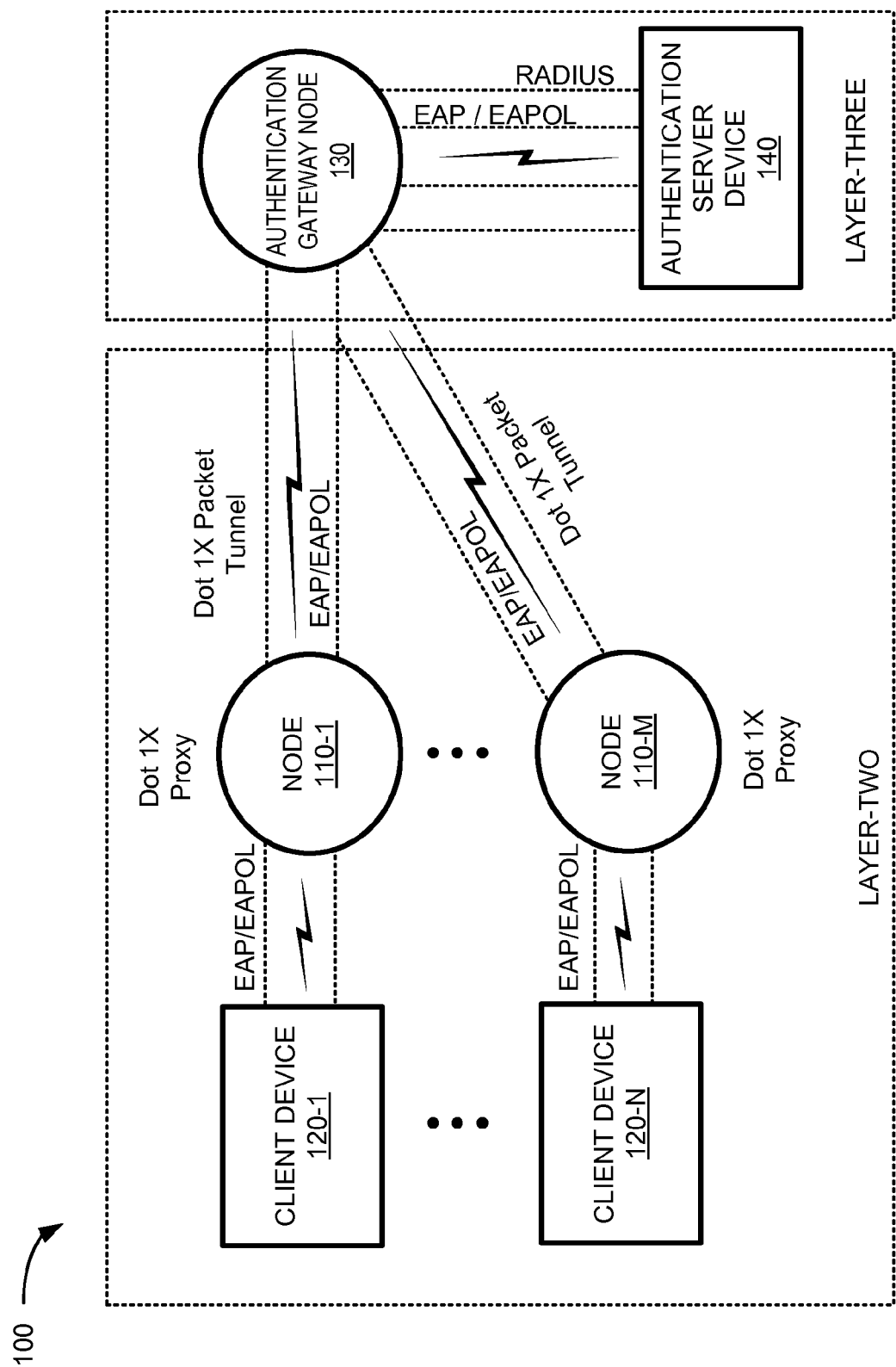
FIG. 1 is a diagram of an example network in which systems and/or methods described herein may be implemented.

The following detailed description refers to the accompanying drawings. The same reference numbers in different drawings may identify the same or similar elements. Also, the following detailed description does not limit the invention.

Systems and/or methods described herein may enable a network node that does not have access to an authentication server to authenticate a client device by communicating, as a proxy for the client device, with an authentication gateway node using a layer-two tunneling protocol.

The term "layer two," as used herein, may correspond to a data link layer associated with an Open System Interconnection (OSI) model. The data link layer may correspond to protocols and/or connections associated with transferring data between network devices based on physical addresses associated with the network devices. The term "layer three," as used herein, may correspond to a network layer associated with the OSI model. The network layer may corresponds to protocols and/or network paths associated with transferring data between network devices based on logical addresses associated with the network devices.

As described herein, an authentication proxy application (hereinafter referred to as a "proxy application") may enable a layer-two network node to authenticate a client device when the layer-two network node is unable to communicate with an authentication server (e.g., using a layer-three protocol). The proxy application may communicate, on behalf of the client device, with an authentication gateway network node, using a layer-two tunneling protocol to perform the authentication operation. The authentication gateway network node may receive credentials associated with the client device, via the layer-two tunneling protocol, and may communicate with the authentication server, using layer-three protocols, in order to authenticate the client device.

Authenticating client devices, via one or more layer-two network nodes, may enable network node architectures to be simplified by not equipping network nodes with authentication components and/or layer-three architectures. The simplified network node architectures may reduce the cost and/or complexity associated with the network nodes. Alternatively, or additionally, the simplified network nodes may enable authentication services to be centralized within a network (e.g., within one or more authentication servers), which may reduce the cost and/or effort associated with tracking and/or managing security services within the network by network security personnel.

The term "virtual local area network (VLAN)," as used herein, may include attributes that are the same or similar to a physical local area network (LAN) that enables client devices and/or other devices to be grouped together to interact and/or receive a common set of services (e.g., security, network management, communications, traffic flow management, etc.) regardless of physical locations at which the client devices are connected. For example, a network node may include a VLAN (e.g., a printer VLAN) that permits network traffic to be sent to one or more client devices that are printers and/or provide printing services. Unlike a physical LAN, however, a VLAN may not be directly tied to specific hardware and/or may share bandwidth, transport, and/or processing capacity/resources associated with the underlying network.

FIG. 1 is a diagram of an example network 100 in which systems and/or methods described herein may be implemented. As shown in FIG. 1, network 100 may include a group of network nodes 110-1, . . . , 110-M (where M≥1) (hereinafter referred to collectively as "nodes 110" and individually as "node 110"), a group of client devices 120-1, . . . , 120-N (where N≥1) (hereinafter referred to collectively as "client devices 120" and individually as "client device 120"), an authentication gateway node 130 (hereafter referred to as "gateway node 130"), and an authentication server device 140 (hereinafter referred to as "authentication server 140"). The number of devices and/or nodes, illustrated in FIG. 1, is provided for explanatory purposes only. In practice, there may be additional devices and/or nodes, fewer devices and/or nodes, different devices and/or nodes, or differently arranged devices and/or nodes than illustrated in FIG. 1. Also, in some implementations, one or more of the devices and/or nodes of network 100 may perform one or more functions described as being performed by another one or more of the devices and/or nodes of network 100. Devices and/or nodes of network 100 may interconnect via wired connections, wireless connections, or a combination of wired and wireless connections.

Node 110 may include a network device that transmits data traffic. For example, node 110 may take the form of a routing device, a switching device, a multiplexing device, or a device that performs a combination of routing, switching, and/or multiplexing functions. In one implementation, node 110 may be a digital device. In another implementation, node 110 may be an optical device. In yet another implementation, node 110 may be a combination of a digital device and an optical device.

Node 110 may include an internal or external storage device and/or memory that stores information associated with node 110 operations. In one example, node 110 may store, in the storage device and/or memory, network topology information, routing tables, packet forwarding tables, and/or multicast forwarding tables. In another example, node 110 may store, in the storage device and/or memory, information associated with virtual local area network (VLAN) configurations (e.g., identifiers, port assignments, associated MAC addresses, etc.).

Node 110 may act as an edge device and may generally function to connect client device 120 to network 100 via layer-two communications and/or using layer-two protocols. Additionally, or alternatively, node 110 may act as a core device and may function to transmit traffic between other nodes 110 and/or gateway node 130 within network 100 and/or another network via layer-two communications and/or using layer-two protocols. Node 110 may add (push) and/or remove (pop) information (e.g., headers, trailers, tags, etc.) from incoming and/or outgoing packets. In another implementation, node 110 may host a VLAN (e.g., a private VLAN (PVLAN), etc.), or a set of VLANs, that may be used to process traffic transmitted to and/or received from client device 120, gateway node 130, and/or another node 110.

Node 110 may host a proxy application that initiates and/or performs operations associated with authentication functions when interacting with client device 120 and/or gateway node 130. In one example implementation, the proxy application may execute authentication protocols based on the Institute of Electrical and Electronics Engineers (IEEE) 802.1X authentication protocol (sometimes referred to herein as "dot1X"). Node 110 may detect client device 120, via a layer-two dot1X port associated with node 110, and may communicate with client device 120, via the dot1X port, to initiate an authentication operation. In one example, node 110 may communicate with client device 120 using an extensible authentication protocol (e.g., EAP or EAP over a local area network (EAPOL)) to obtain information associated with client device 120 (e.g., a device identifier, a media access control (MAC) address, an Internet Protocol (IP) address, etc.) and/or information associated with a user of client device 120 (e.g., a username, password, personal identification number, etc.).

Node 110 may receive the information associated with client device 120 and/or information associated with the user (e.g., encapsulated in an EAP and/or EAPOL header/trailer). Node 110 may communicate with gateway node 130 (e.g., as a supplicant on behalf of client device 120), to initiate an authentication operation with gateway node 130 (e.g., as an authenticator) in order to receive authentication services on behalf of client device 120. In one example, node 110 may communicate with gateway node 130, via a port associated with a PVLAN hosted by node 110, using a layer-two tunneling protocol to transmit the information associated with client device 120 and/or information associated with the user. The layer-two tunneling protocol may be based on an IEEE 802.1X standard, which may transport dot1X packets between node 110 and gateway node 130. Node 110 may receive, via the layer-two tunneling protocol, an authentication notification from gateway node 130 and may initiate an authentication session with client device 120 that permits client device 120 to communicate with network 100.

Client device 120 may include any device that performs a function, provides a service, and/or is capable of communicating with a network. In one example implementation, client device 120 may include a computer system (e.g., that includes a router, a server device, a workstation, or a computer device), a telephone system (e.g., that includes a landline telephone or a private branch exchange (PBX)), a wireless telephone, a set top box (STB), a television, a close capture television (CCTV) system, a camera, a personal gaming system, or an appliance (e.g., a refrigerator, a stove, a vending machine, etc.). In another example, client device 120 may be a smart grid device, such as a power generation device, a thermostat, a sensor (e.g., a motion detector, a door sensor/alarm, a smoke detector, etc.), an air handler, an HVAC system, a building security system, a fire detection/alarm/suppression system, a thermometer, a device to measure humidity (e.g., a psychrometer, a hygrometer, etc.), a light and/or lighting system, a power panel, etc. The devices described above may include passive devices that generally engage in one-way communications and/or active devices that generally engage in two-way communications.

Client device 120 may send packets to and/or receive packets from node 110. Client device 120 may send an access request to node 110 and/or respond to an identity request received from node 110. Client device 120 may communicate with node 110 using an EAP and/or EAPOL protocol when engaged in authentication operations.

Gateway node 130 may include a network device that transmits data traffic. For example, gateway node 130 may take the form of a routing device, a switching device, a multiplexing device, or a device that performs a combination of routing, switching, and/or multiplexing functions. In one implementation, gateway node 130 may be a digital device. In another implementation, gateway node 130 may be an optical device. In yet another implementation, gateway node 130 may be a combination of a digital device and an optical device.

Gateway node 130 may include an internal or external storage device and/or memory that stores information associated with gateway node 130 operations. In one example, gateway node 130 may store, in the storage device and/or memory, network topology information, routing tables, packet forwarding tables, and/or multicast forwarding tables.

Gateway node 130 may process traffic sent to and/or received from node 110, authentication server 140, and/or other authentication nodes 130 via layer-two, layer-three, and/or other communications, and/or using layer-two, layer-three and/or other protocols. Gateway node 130 may add (push) and/or remove (pop) information (e.g., headers, trailers, tags, etc.) from incoming and/or outgoing packets.

Gateway node 130 may act as an authenticator and may perform authentication functions when interacting with authentication server 140 and/or node 110 (e.g., acting as a proxy for client device 120). For example, gateway node 130 may communicate with node 110 when performing an authentication operation associated with client device 120. Node 110, when acting as a proxy for client device 120, may appear, to gateway node 130, as an unauthenticated client device 120. Gateway node 130 may, for example, receive information associated with client device 120 (e.g., an unregistered MAC address, IP address, device identifier, etc.) and/or information associated with a user of client device 120 from node 110 via a layer-two tunneling protocol. Gateway node 130 may communicate, using a layer-three authentication protocol (e.g., a remote authentication dial in user service (RADIUS) protocol), with authentication server 140 in order to authenticate client device 120.

Gateway node 130 may receive an authentication notification from authentication server 140 and may send the authentication notification to node 110 via the layer-two tunnel.

Authentication server 140 may include one or more server devices, or other types of computation or communication devices, that gather, process, search, store, and/or provide information in a manner similar to that described herein. In one example implementation, authentication server 140 may perform authentication operations on behalf of gateway node 130. In one example, authentication server 140 may be capable of communicating with gateway node 130 using a layer-two and/or layer-three authentication protocol (e.g., EAP, EAPOL, RADIUS protocol, etc.) when performing authentication operations. Authentication server 140 may, for example, receive a request (e.g., from gateway node 130) for authentication services and may use the information associated with client device 120, obtained from the request, to determine whether to authenticate client device 120. Authentication server 140 may send a notification to node 110 indicating whether client device 120 was authenticated.

Figure 2:
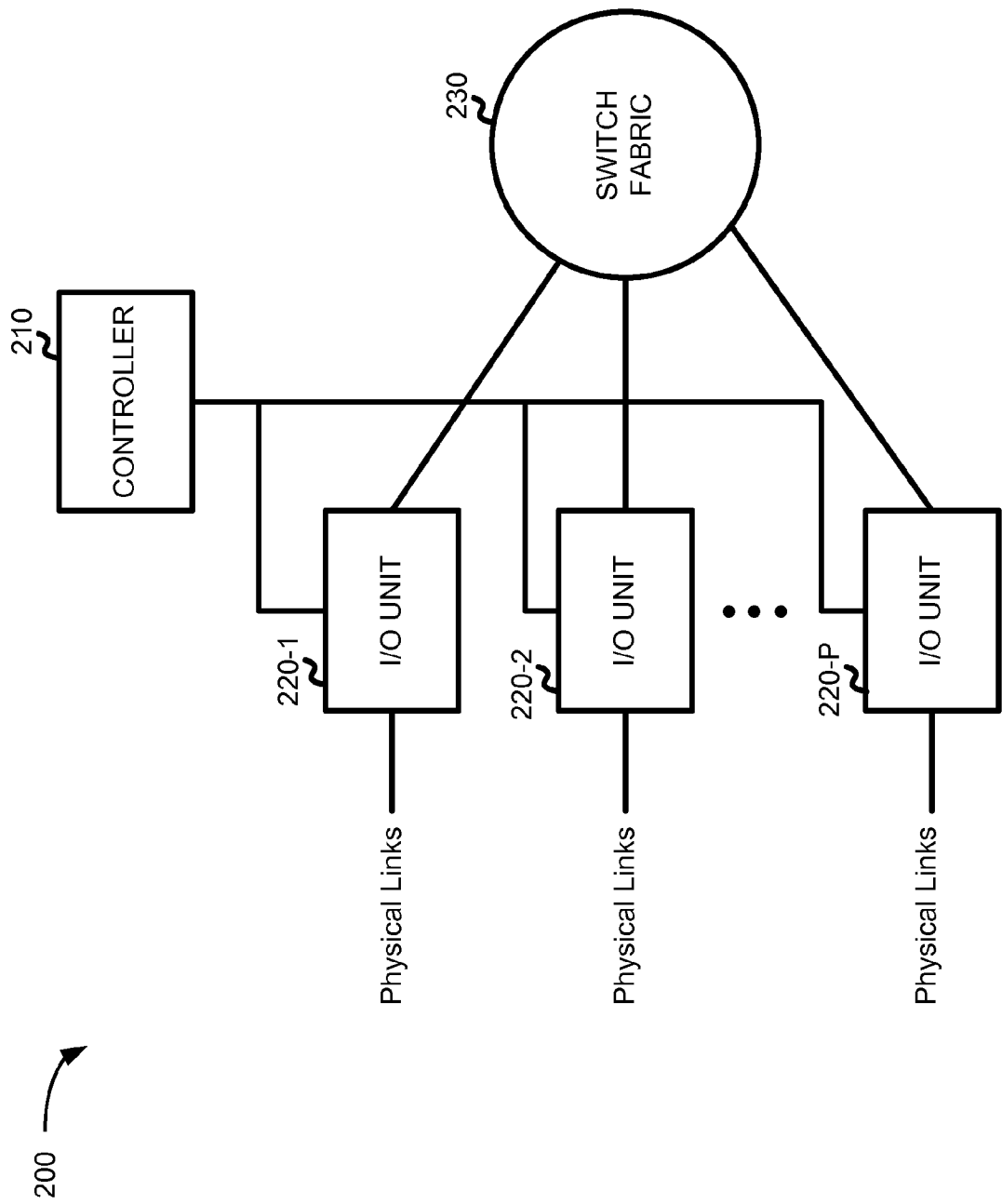
FIG. 2 is a diagram of example components of one or more network nodes of FIG. 1.

FIG. 2 is a diagram of example components of node 200 that may correspond to node 110 and/or gateway node 130. In this example implementation, node 200 may take the form of a router, although the systems and/or methods herein may be implemented in another type of network device. For example, node 200 may include another data transfer device, such as a gateway, a switch, a firewall, a network interface card (NIC), a hub, a bridge, a proxy server, an optical add-drop multiplexer (OADM), or some other type of device that processes and/or transfers traffic.

Node 200 may receive network traffic, as one or more packet stream(s), from physical links, may process the packet stream(s) to determine destination information, and may transmit the packet stream(s) out on links in accordance with the destination information. Node 200 may include a controller 210, a set of input/output (I/O) units 220-1, 220-2, . . . , 220-P (where P≥1) (hereinafter referred to collectively as "I/O units 220" and individually as "I/O unit 220"), and a switch fabric 230.

Controller 210 may include a processor, a microprocessor, or some form of hardware logic (e.g., an application specific integrated circuit (ASIC) or a field programmable gate array (FPGA)). In one example implementation, controller 210 may include an Ethernet controller and/or another controller device. Controller 210 may perform high level management functions for node 200. For example, controller 210 may maintain the connectivity and manage information/data necessary for transferring packets by node 200. Controller 210 may create routing tables based on network topology information, create forwarding tables based on the routing tables, and communicate the forwarding tables to I/O units 220. I/O units 220 may use the forwarding tables to perform route lookup for incoming packets and perform the forwarding functions for node 200. Controller 210 may also perform other general control and monitoring functions for node 200. Controller 210 may perform authentication operations using EAP, EAPOL, RADIUS, and/or other authentication protocols based on information associated with client device 120 and/or a user of client device 120.

I/O unit 220 may include a component or collection of components to receive incoming packets, to process incoming and/or outgoing packets, and/or to transmit outgoing packets. For example, I/O unit 220 may include I/O ports, a packet forwarding component (PFC), an Ethernet interface and/or another type of interface, a central processing unit (CPU), and/or a memory device. I/O unit 220 may include a collection of ports that receive or transmit packets via physical links. I/O unit 220 may also include packet processing component(s), switch interface component(s), Internet processor component(s), memory device(s), etc.

Each of I/O units 220 may be connected to controller 210 and switch fabric 230. I/O units 220 may receive packet data on physical links connected to a network (e.g., network 100). Each physical link could be one of many types of transport media, such as an optical fiber or an Ethernet cable.

I/O units 220 may process incoming packet data prior to transmitting the data to another I/O unit 220 or the network. I/O units 220 may perform route lookups for the data using the forwarding table from controller 210 to determine destination information. If the destination indicates that the data should be sent out on a physical link, connected to I/O unit 220, then I/O unit 220 may prepare the data for transmission by, for example, adding any necessary headers (e.g., layer-two tunneling headers, EAP headers, RADIUS headers, etc.) and/or modifying existing headers, and/or transmitting the data from the port associated with the physical link. If the destination indicates that the data should be sent to another I/O unit 220 via switch fabric 230, then I/O unit 220 may, if necessary, prepare the data for transmission to the other I/O unit 220 and/or may send the data to the other I/O unit 220 via switch fabric 230.

Switch fabric 230 may include one or multiple switching planes to facilitate communication among I/O units 220 and/or controller 210. In one implementation, each of the switching planes may include a single-stage switch or a multi-stage switch of crossbar elements. Switch fabric 230 may also, or alternatively, include processors, memories, and/or paths that permit communication among I/O units 220 and/or controller 210.

Although, FIG. 2 illustrates example components of node 200, in other implementations, node 200 may include additional components, fewer components, different components, or differently arranged components than those illustrated in FIG. 2 and described herein. Additionally, or alternatively, one or more operations described as being performed by a particular component of node 200 may be performed by one or more other components, in addition to or instead of the particular component of node 200.

Figure 3:
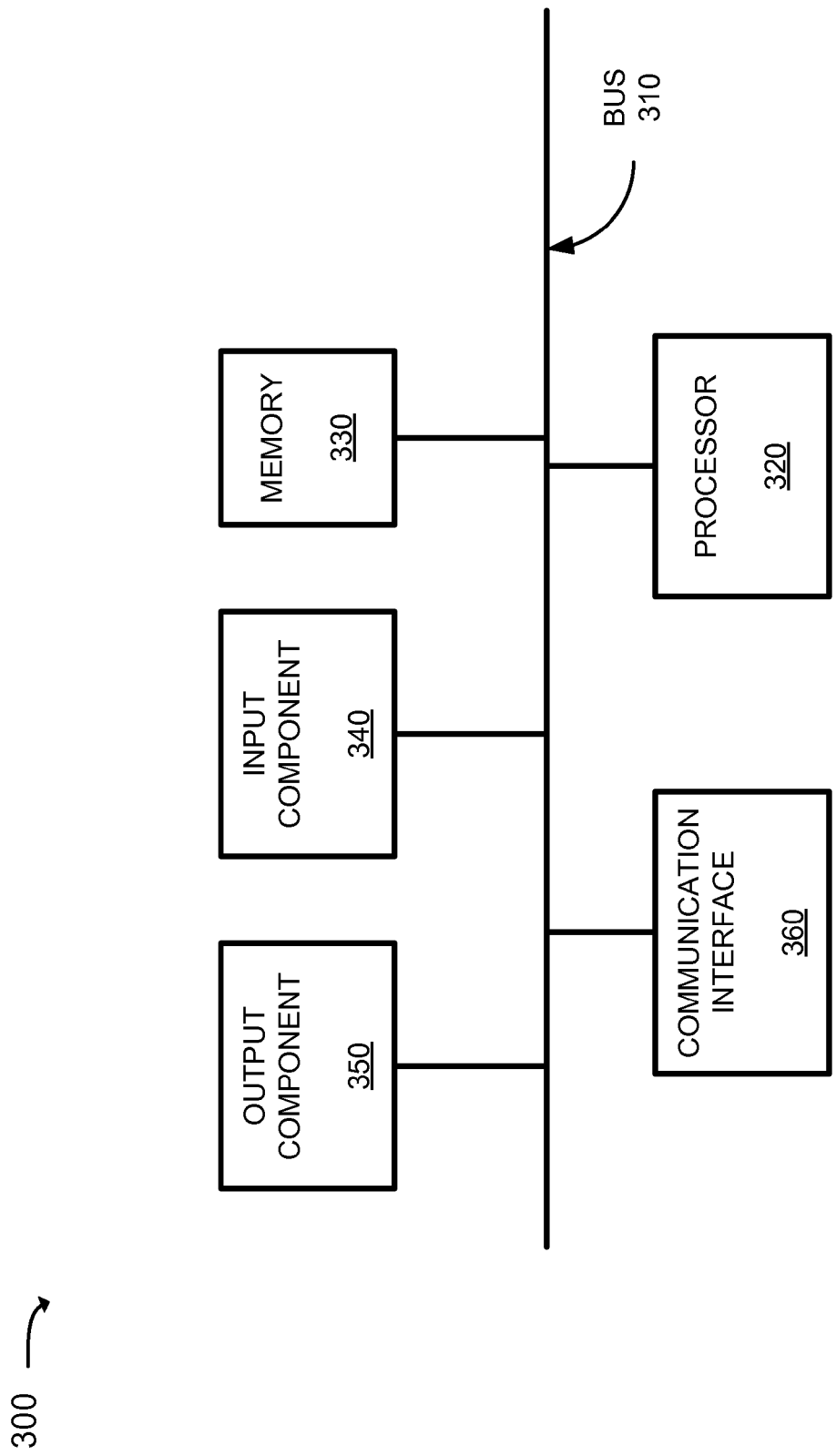
FIG. 3 is a diagram of example components of one or more of the devices of FIG. 1.

FIG. 3 is a diagram of example components of a device 300 that may correspond to client device 120 and/or authentication server 140. Each of client device 120 and/or authentication server 140 may include one or more devices 300. Device 300 may include a bus 310, a processor 320, a memory 330, an input component 340, an output component 350, and a communication interface 360. Although FIG. 3 shows example components of device 300, in other implementations, device 300 may include fewer components, additional components, different components, or differently arranged components than depicted in FIG. 3. Additionally, or alternatively, in other implementations, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, a printer, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.) or a combination of wireless and wired communications. For example, communication interface 360 may include mechanisms for communicating with another device or system via a network, such as network 100.

As will be described in detail below, device 300 may perform certain operations relating to an authentication operation. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
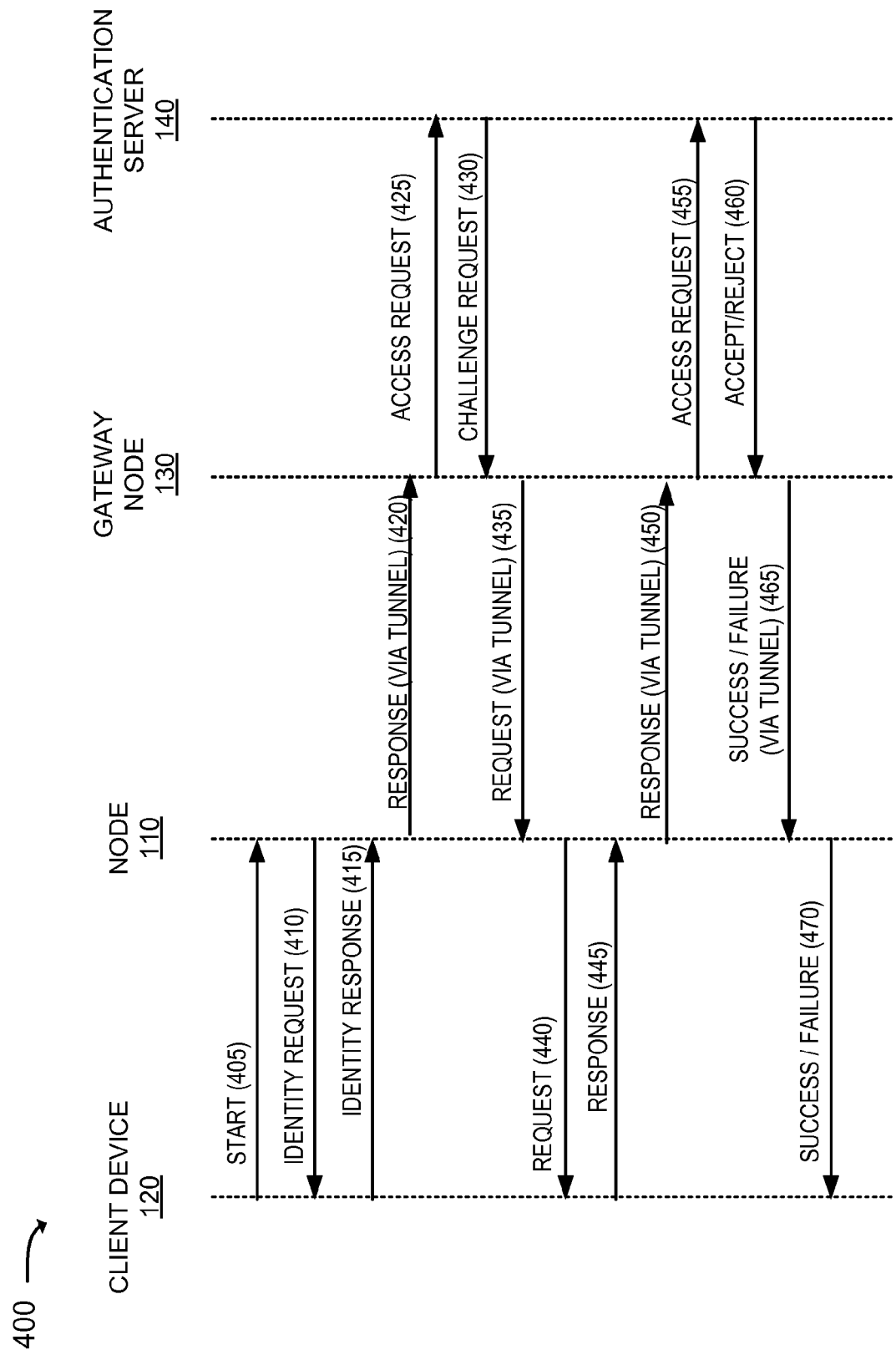
FIG. 4 is a diagram of an example signal flow to authenticate a client device using a network node of FIG. 1 as a proxy.

FIG. 4 is an example signal flow diagram to authenticate client device 120 using network node 110 as a proxy. Example network portion 400 may include node 110, client device 120, gateway node 130, and authentication server 140. Node 110, client device 120, gateway node 130, and authentication server 140 may include features described above in connection with FIG. 1.

As shown in FIG. 4, an example authentication operation using node 110, may include detecting a presence of client device 120 on network 100. For example, node 110 may receive, from client device 120, a packet (e.g., a hello packet or series of hello packets and/or some other indicator), as start indication 405, when client device 120 powers up and/or establishes a connection with network 100. Node 110 may receive the packet via an out-of-band port (e.g., a port capable of receiving layer-two dot1X traffic) associated with node 110. The proxy application, on node 110, may send, as identity request 410, a request for credentials associated with client device 120. Request 410 may be sent using a layer-two authentication protocol (e.g., an EAPOL request or some other authentication protocol) via the out-of-band port. For example, request 410 may include one or more packets associated with the layer-two authentication protocol.

Client device 120 may receive request 410 and may send a response, as identity response 415, to node 110. Response 415 may include information associated with client device 120 (e.g., a MAC address, an IP address, a device identifier, etc.). Response 415 may be sent using the layer-two authentication protocol. Node 110 may receive response 415 and the proxy application may send a response, as response (via tunnel) 420, to gateway node 130, via a port associated with a PVLAN hosted by node 110. The proxy application may send response 420 using a layer-two tunneling protocol. For example, the proxy application may encapsulate response 420 in packets associated with the layer-two tunneling protocol.

Gateway node 130 may receive response 420 via the tunnel and may process response 420 to obtain the information associated with client device 120 (e.g. by removing headers, trailers, etc. associated with layer-two tunneling protocol and/or layer-two authentication protocol). Gateway node 130 may send an authentication request, as access request 425, to authentication server 140. Access request 425 may be sent to authentication server 140 using a layer-three authentication protocol (e.g., a RADIUS protocol), which may include encapsulating access request 425 (e.g., that includes the information associated with client device 120) in packets associated with the RADIUS protocol (e.g., by adding headers, labels, trailers, etc. associated with the RADIUS protocol). Authentication server 140 may receive access request 425 and may process the authentication request to obtain the information associated with client device 120 (e.g. by removing headers, trailers, etc. associated with layer-three RADIUS protocols). Authentication server 140 may, for example, perform an authentication operation, based on the information associated with client device 120, to determine whether the information associated with client device 120 can be verified. Authentication server 140 may generate a request for challenge information based on a determination that the information associated with client device 120 has been verified. Authentication server 140 may send the request for challenge information, as challenge request 430, to gateway node 130 based on the layer-three authentication protocol.

Gateway node 130 may receive challenge request 430 and may process challenge request for information (e.g., by removing layer-three headers, trailer etc.). Gateway node 130 may, based on the request for challenge information, generate another request for challenge information based on the level-two authentication protocol (e.g., an EAP request). For example, gateway node 130 may encapsulate the other request for challenge information in packets associated with the layer-two tunneling protocol. Gateway node 130 may send the other request for challenge information (e.g., the EAP request), as request (via tunnel) 435, to node 110 via the tunnel. Node 110 may receive request 435 via the port associated with the PVLAN and the proxy application may process the other request for challenge information. The proxy application may send the other request for challenge information, as request 440, to client device 120 via the layer-two out-of-band port.

Client device 120 may receive request 440 and may obtain other information associated with client device 120 in response to the other request for challenge information. In one example, client device 120 may retrieve other information associated with client device 120 (e.g., answers to security questions, other device identifiers, a token, etc.) from a memory associated with client device 120. In another example, client device 120 may receive information from a user of client device 120 (e.g., username, password, personal identification number (PIN), etc.). Client device 120 may, in response to the request for challenge information, send the other information associated with client device 120, as response 445, to node 110. Response 445 may be sent using a layer-two authentication protocol (e.g., EAP). Node 110 may receive response 445 and the proxy application may encapsulate response 445 in packets associated with the layer-two tunneling protocol. The proxy application may send the response, as response (via tunnel) 450, to gateway node 130.

Gateway node 130 may receive response 450, via the layer-two tunnel, and may process response 450 (e.g., by removing headers, trailers, etc. associated with the layer-two tunneling protocol). Gateway node 130 may send another access request, as access request 455, to authentication server 140 based on the layer-three authentication protocol (e.g., the RADIUS protocol). Authentication server 140 may receive access request 455 and may process access request 455 to obtain the other information associated with client device 120 (e.g., by removing headers, trailers, etc. associated with the RADIUS protocol and/or headers, trailer, etc. associated with the EAP protocol). Authentication server 140 may, for example, determine whether the other information associated with client device 120, received in access request 455, matches other information associated with client device 120 stored in a memory associated with authentication server 140. If the other information received in access request 455 matches the stored other information, then authentication server 140 may generate an accept notification. If, however, the challenge information received in access request 455 does not match the stored challenge information, then authentication server 140 may generate a reject notification. Authentication server 140 may send the accept and/or reject notification, as accept/reject 460, to gateway node 130 based on the layer-three authentication protocol.

Gateway node 130 may receive accept/reject 460 and may process the accept/reject notification (e.g., by removing layer-three headers, trailers, etc.). Gateway node 130 may, based on the accept/reject notification, generate a success/failure notification, respectively, based on the level-two authentication protocol (e.g., an EAP success/failure) and may encapsulate the success/failure notification in packets associated with the layer-two tunneling protocol. Gateway node 130 may send the success/failure notification, as success/failure (via tunnel) 465, to node 110 via the tunnel.

Node 110 may receive success/failure 465 via the port associated with the PVLAN and the proxy application may process the success/failure notification (e.g., by removing headers, trailers, etc. associated with the layer-two tunneling protocol). The proxy application may, in response to an accept notification, establish an authentication session with client device 120. The proxy application may, for example, establish the authentication session for a period of time during which client device 120 is authorized to communicate with network 100. The period of time may be determined by node 110 and/or may be specified by gateway node 130. Alternatively or additionally, the proxy application may establish a connection with client device 120 via an in-band, layer-two port (e.g., or by setting the out-of-band port to an authorized state, such as an authorized dot1X port) associated with the PVLAN hosted by node 110.

The proxy application may, in response to a failure notification, not establish an authentication session with client device 120. The proxy application may deny client device 3 120 from accessing the network by maintaining the out-of-band, layer-two port in an unauthorized state. The proxy application may send the success/failure notification, as success/failure 470, to client device 120 using the layer-two authentication protocol (e.g., EAP).

Figure 5:
FIG. 5 is a flow chart of an example process for authenticating a client device using a network node of FIG. 1 as a proxy.

FIG. 5 is a flow chart of an example process 500 for authenticating client device 120 using a node 110. In one example implementation, process 500 may be performed by node 110. In another example implementation, some or all of process 500 may be performed by another device or group of devices separate from, or in combination with node 110.

As shown in FIG. 5, process 500 may include detecting a client device (block 505). Assume that node 110 is a layer-two node 110 and is not connected to an authentication server (e.g., authentication server 140). Assume further that gateway node 130 is interconnected to an authentication server and is capable of receiving, processing, and/or transmitting packets using layer-two/layer-three communications and/or protocols. Assume still further that client device 120 has been in an inactive state and/or has been turned off for a period of time. For example, a client device (e.g., client device 120) may be connected to a network (e.g., network 100) and may power up. Client device 120 may, as a result of powering up, send an indication to node 110, that client device 120 is connected to network 100. Node 110 may receive the indication and may detect the presence of client device 120, on network 100, via a particular port (e.g., a port configured to receive dot1X traffic to facilitate authentication functions) associated with node 110.

As also shown in FIG. 5, process 500 may include sending an identity request to client device 120 and receiving a response to the identity request (block 510). For example, based on the detection of client device 120, node 110 may send a request for information associated with client device 120 (e.g., an identity request) to client device 120. In one example, node 110 may send the identity request using an EAPOL protocol via the dot1X port. Client device 120 may receive the identity request (e.g., on a port configured for dot1X traffic) and may send a response, to the identity request, to node 110. In one example, the request for access may be an identity response, based on the EAPOL protocol, that includes information associated with client device 120, such as address information (e.g., an unregistered IP address, MAC address, multicast MAC address, etc.) and/or a device identifier (e.g., a device identification number, a mobile directory number (MDN), a landline directory number (LDN), an international mobile subscriber identity (IMSI), a mobile subscriber integrated services digital network (MSISDN) identifier, a driver identifier, a printer device identifier, a vendor identifier, an electronic serial number (ESN), a universal integrated circuit card (UICC) identifier, etc.). Node 110 may receive the response (e.g., via the dot1X port) and the proxy application may process the response.

As further shown in FIG. 5, process 500 may include sending an authentication request via a layer-two tunnel (block 515). For example, the proxy application may process the response, based on a layer-two tunneling protocol, to create an authentication request. Alternatively, or additionally, the proxy application may use a PVLAN, hosted by node 110, to output the authentication request, via a port associated with the PVLAN and the layer-two tunnel, to gateway node 130. In another example, the proxy application may send the authentication to gateway node 130 via a network path that includes one or more other nodes 110. The authentication request may include the information associated with client device 120 (e.g., encapsulated in packets associated with the EAPOL protocol).

Gateway node 130 may receive the authentication request via the layer-two tunnel and may send the authentication request to authentication server 140 using a layer-three authentication protocol (e.g., RADIUS protocol). Authentication server 140 may process the request to obtain the information associated with client device 120 and may perform an authentication operation to determine whether the information associated with client device 120 can be verified. For example, authentication server 140 may determine whether information associated with client device 120, obtained from the authentication request, matches other information associated with client device 120 stored in a memory associated with authentication server 140. If the information associated with client device 120, obtained from the authentication request, matches the stored information associated with client device 120, then authentication server 140 may generate a request for challenge information. Authentication server 140 may send the request for challenge information to gateway node 130 based on the layer-three authentication protocol. If, however, the information associated with client device 120, obtained from the authentication request, does not match the stored information associated with client device 120, then authentication server 140 may send, to gateway node 130, a notification that information associated with client device 120 could not be verified (e.g., a reject notification).

As yet further shown in FIG. 5, if a challenge request is not received (block 520—NO), then process 500 may include sending a notification that access is not authorized (block 525). For example, gateway node 130 may receive, from authentication server 140, the notification that information associated with client device 120 could not be verified and gateway node 130 may send a notification to node 110, via the layer-two tunnel, that the information associated with client device 120 could not be verified. The notification may be sent using a layer-two authentication protocol (e.g., EAP). Node 110 may receive the notification via the layer-two tunnel and via the port associated with the PVLAN. The proxy application may, in response to the notification, send a notification, to client device 120, that access to network 100 is not authorized. The notification may be sent using the layer-two authentication protocol and via a port configured to send and/or receive dot1X traffic and to ignore or drop traffic that is not dot1X traffic.

As still further shown in FIG. 5, if a challenge request is received (block 520≤YES), then process 500 may include sending a challenge request to client device 120 and receiving a response to the challenge request (block 530). For example, gateway node 130 may receive, from authentication server 140, a request for challenge information based on a determination that the information associated with client device 120 could be verified. The request for challenge information may have been sent using a layer-three authentication protocol (e.g., a RADIUS protocol). Gateway node 130 may send the request for challenge information to node 110, via the layer-two tunnel and using a layer-two authentication protocol (e.g., EAP). Node 110 may receive the request for challenge information, via the layer-two tunnel and via the port associated with the PVLAN. The proxy application may, in response to the request for challenge information, send, to client device 120, a request for challenge information using the layer-two authentication protocol and via the port configured to send and/or receive dot1X traffic and to ignore or drop traffic that is not dot1X traffic.

Client device 120 may receive the request for challenge information and may obtain challenge information associated with client device 120. The challenge information associated with client device 120 may include information associated with a user of client device 120 (e.g., a username, password, PIN, email address, biometric information, etc.). Alternatively, the challenge information associated with client device 120 may include another address and/or device identifier associated with client device 120, answers to security questions, etc. Client device 120 may send a response (e.g. a challenge response) to the request for challenge information (e.g., that includes the challenge information associated with client device 120), to node 110, using the layer-two authentication protocol. Node 110 may receive the challenge response via the port configured to receive dot1X traffic and to ignore or drop traffic that is not dot1X traffic.

As shown in FIG. 5, process 500 may include sending a challenge response via a layer-two tunnel (block 535). For example, the proxy application may process the challenge response using the layer-two tunneling protocol. The proxy application may output the challenge response, via a port associated with the PVLAN and the layer-two tunnel, to gateway node 130. The challenge response may include the other information associated with client device 120.

Gateway node 130 may receive the challenge response via the layer-two tunnel and may send the challenge response to authentication server 140 using a layer-three authentication protocol (e.g., RADIUS protocol). Authentication server 140 may process the challenge response to obtain the challenge information associated with client device 120 and may perform an authentication operation to determine whether the challenge information associated with client device 120 matches other challenge information associated with client device 120 stored in the memory associated with authentication server 140. If the challenge information, obtained from the challenge request, matches the stored challenge information, then authentication server 140 may generate an accept notification indicating that client device 120 has been successfully authenticated. Authentication server 140 may send the accept notification to gateway node 130 based on the layer-three authentication protocol. If, however, the challenge information, obtained from the authentication request, does not match the stored challenge information, then authentication server 140 may generate a reject notification indicating that authentication of client device 120 has failed. Authentication server 140 may send the reject notification to gateway node 130 based on the layer-three authentication protocol.

As also shown in FIG. 5, if a success notification is not received (block 540—NO), the process 500 may include sending a notification that access is not authorized (block 525). For example, gateway node 130 may receive, from authentication server 140, the reject notification and gateway node 130 may send a failure notification to node 110, via the layer-two tunnel. The failure notification may be sent using a layer-two authentication protocol (e.g., EAP). Node 110 may receive the failure notification via the layer-two tunnel and via the port associated with the PVLAN. The proxy application may, in response to the failure notification, send a failure notification, to client device 120, indicating that access to network 100 is not authorized. The failure notification may be sent using the layer-two authentication protocol and via a port configured to send and/or receive dot1X traffic.

As further shown in FIG. 5, if a success notification is received (block 540—YES), the process 500 may include establishing an authenticated session with client device 120 (block 545). For example, gateway node 130 may receive, from authentication server 140, an accept notification and gateway node 130 may send a success notification to node 110, via the layer-two tunnel and using a layer-two authentication protocol (e.g., EAP). Node 110 may receive the success notification, via the layer-two tunnel and via the port associated with the PVLAN. The proxy application may, in response to the success notification, establish an authentication session with client device 120.

The authentication session may enable client device 120 to communicate with network 120. In one example, the proxy application may establish the authentication session for a period of time during which client device 120 is authorized to communicate with network 100. The period of time may be determined by node 110 and/or may be specified by gateway node 130. The proxy application may establish a connection with client device 120 via an in-band and/or authorized layer-two port (e.g. an authorized dot1X port) associated with the PVLAN hosted by node 110. The proxy application may send the success notification to client device 120 using the layer-two authentication protocol (e.g., EAP).

Systems and/or methods described herein may enable a network node that does not have access to an authentication server to authenticate a client device by communicating, as a proxy for the client device, via an authentication gateway node using a layer-two tunneling protocol. The systems and/or methods may enable network node architectures to be simplified by not equipping network nodes with authentication components and/or layer-three architectures. The simplified network node architectures may reduce the cost and/or complexity associated with the network nodes. Alternatively, or additionally, the systems and/or methods may enable authentication services to be centralized within a network (e.g., within one or more authentication servers), which may reduce the cost and/or effort associated with tracking and/or managing security services within the network by network security personnel.

The foregoing description of implementations provides illustration and description, but is not intended to be exhaustive or to limit the implementations to the precise form disclosed. Modifications and variations are possible in light of the above teachings or may be acquired from practice of the invention.

For example, while a series of blocks has been described with regard to FIG. 5, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The term "packet" as used herein, may refer to a datagram, a data item, or a cell; a fragment of a packet, a fragment of a datagram, a fragment of a data item, a fragment of a cell; or another type, arrangement, or packaging of data.

What is claimed is:

1. A network node comprising:
 a processor to:
  receive, from a client device, an access request via a first port that drops traffic that is not associated with an authentication operation,
   the access request being received using a layer-two authentication protocol,
   the access request including information associated with the client device, transmit, to another network node and based on the access request, an authentication request via a second port,
the authentication request including the information associated with the client device,
the authentication request being transmitted using a layer-two tunnel,
the other network node communicating with an authentication server, using a layer-three authentication protocol, to authenticate the client device based on the information associated with the client device,
receive, from the other network node and via the second port, a request for challenge information based on transmitting the authentication request,
the request for challenge information being received via the layer-two tunnel,
the request for challenge information being received by the other network node from the authentication server,
transmit, to the client device and via the first port, the request for challenge information using the layer-two authentication protocol,
receive, from the client device and using the layer-two authentication protocol, a response to the request for challenge information,
transmit, to the other network node and via the layer-two tunnel, the response,
receive, from the other network node and via the second port, a notification that the client device is authenticated,
the notification being received using the layer-two tunnel based on transmitting the response, and
establish an authentication session with the client device based on the notification,
when establishing the authentication session, the processor is to set the first port to an authorized state that enables the network node to process traffic that is not associated with the authentication operation.

2. The network node of claim 1, where, when establishing the authentication session with the client device, the processor is further to:
associate the first port with a virtual local area network (VLAN), hosted by the network node, that enables the client device to communicate with a network via the VLAN.

3. The network node of claim 1, where the processor is further to:
receive another access request from another client device using the layer-two authentication protocol,
the other access request being received via a third port in an unauthorized state,
where the unauthorized state does not permit the network node to process traffic sent to or received from the other client device,
output the other access request to the other network node using the layer-two tunnel,
receive, from the other network node and based on outputting the other access request, another notification indicating that the other client device is not authenticated, and
maintain the third port in the unauthorized state based on the other notification.

4. The network node of claim 1, where the processor is further to:
receive, after establishing the authentication session, traffic destined for the client device,
determine whether a period of time associated with the authentication session has expired,
where the period of time is based on a time after the authentication session has been established and a time at which the authentication session was established, and
selectively:
send the traffic to the client device and via the first port based on a determination that the authentication session has not expired, or
drop the traffic based on a determination that the authentication session has expired.

5. The network node of claim 1, where the processor is further to:
extract the information identifying the client device from the access request, and
insert the information identifying the client device into the authentication request,
where the information identifying the client device includes at least one of a media access control (MAC) address associated with the client device, an Internet protocol (IP) address associated with the client device, a device identifier associated with the client device, or information associated with a user of the client device.

6. The network node of claim 1, where, when outputting the authentication request via the second port, the processor is to:
encapsulate the information associated with the client device in packets associated with a layer-two tunneling protocol that corresponds to the layer-two tunnel,
where the packets associated with the layer-two tunneling protocol are based on an Institute of Electrical and Electronics Engineers (IEEE) 802.1X standard.

7. The network node of claim 1, where the network node acts as a proxy for the client device when performing an authentication operation associated with the client device,
where the network node appears as an unauthenticated client device, from the perspective of the other network node, when acting as the proxy for the client device, and
where the network node is unable to communicate with the authentication server using the layer-three authentication protocol.

8. A method comprising:
receiving, by a network node, a packet from a client device;
determining, by the network node and based on the packet, that the client device is connected to a network associated with the network node;
obtaining, by the network node, information associated with the client device;
encapsulating, by the network node, the information associated with the client device in one or more packets associated with a layer-two tunneling protocol;
sending, by the network node and to another network node, a request to authenticate the client device,
the request including the one or more packets within which the information associated with the client device is encapsulated,
the request being sent using the layer-two tunneling protocol,
the information associated with the client device permitting the other network node to communicate with an authentication server, via a layer-three authentication protocol, to authenticate the client device;
receiving, from the other network node, a request for challenge information based on sending the request to authenticate the client device, the request for challenge information being received using the layer-two tunneling protocol, the request for challenge information being received by the other network node from the authentication server;

sending, to the client device, the request for challenge information using a layer-two authentication protocol;

receiving, from the client device and using the layer-two authentication protocol, a response to the request for challenge information;

sending, to the other network node and using the layer-two tunneling protocol, the response to the request for challenge information, receiving, by the network node and from the other network node, a notification based on sending the response, the notification being received using the layer-two tunneling protocol; and selectively:

sending, by the network node and to the client device, a first indication that the client device is authorized to communicate with the network when the notification indicates that the client device has been authenticated, or sending, by the network node and to the client device, a second indication that the client device is not authorized to communicate with the network when the notification indicates that the client device has not been authenticated.

9. The method of claim 8, where sending the first indication that the client device is authorized to communicate with the network includes:

establishing an authentication session associated with the client device for a period of time during which the client device is authorized to communicate with the network.

10. The method of claim 8, where determining that the client device is connected to the network includes:

enabling a port that:
accepts traffic associated with an authentication operation, based on an Institute of Electrical and Electronics Engineers (IEEE) 802.1X standard, and
drops traffic that is not associated with the IEEE 802.1X standard.

11. The method of claim 10, where sending the first indication that the client device is authorized to communicate with the network includes:

setting the port to an authorized state that enables the traffic, that is not associated with the IEEE 802.1X standard, to be processed by the network node.

12. The method of claim 8, where obtaining the information associated with the client device further includes:

sending, to the client device, an identity request using a layer-two authentication protocol; and receiving, from the client device, an identity response using the layer-two authentication protocol, where the identity response includes the information associated with the client device, and where the other network node receives the request for challenge information from the authentication server, based on the other network node sending the information associated with the client to the authentication server via the layer-three authentication protocol.

13. A non-transitory computer-readable medium storing instructions, the instructions comprising:

one or more instructions which, when executed by a network node, cause the network node to determine that a client device is connected to a network associated with the network node, the network node being configured to communicate with the client device using a layer-two authentication protocol;

one or more instructions which, when executed by the network node, cause the network node to send, to another network node, information associated with the client device to authenticate the client device based on determining that the client device is connected to the network, the information associated with the client device being sent to the other network node using a layer-two tunneling protocol, the other network node communicating with an authentication server, using a layer-three authentication protocol, to authenticate the client device based on the information associated with the client device;

one or more instructions which, when executed by the network node, cause the network node to receive, from the other network node and using the layer-two tunneling protocol, a request for challenge information based on sending the information associated with the client device to authenticate the client device, the request for challenge information being received by the other network node from the authentication server using the layer-three authentication protocol;

one or more instructions which, when executed by the network node, cause the network node to transmit, to the client device, the request for challenge information using the layer-two authentication protocol;

one or more instructions which, when executed by the network node, cause the network node to receive, from the client device and using the layer-two authentication protocol, a response to the request for challenge information;

one or more instructions which, when executed by the network node, cause the network node to transmit, to the other network node and using the layer-two tunneling protocol, the response to the request for challenge information;

one or more instructions, which when executed by the network node, cause the network node to receive, from the other network node and using the layer-two tunneling protocol, an authentication notification associated with the client device based on transmitting the response, the authentication notification being received by the other network node from the authentication server using the layer-three authentication protocol, the authentication notification indicating that the client device has been authenticated based on the response; and one or more instructions which, when executed by the network node, cause the network node to send, to the client device, an indication that the client device is authorized to communicate with the network based on the authentication notification, the indication being sent using the layer-two authentication protocol, the one or more instructions to send the indication including:

one or more instructions to establish an authentication session that enables the client device to communicate with the network.

14. The non-transitory computer-readable medium of claim 13, where the one or more instructions to send the information associated with the client device include:

one or more instructions to send an authentication request to the other network node,
  where the authentication request is sent via a port, associated with a private local area network (PVLAN) hosted by the network node and using the layer-two tunneling protocol.

15. The non-transitory computer-readable medium of claim 14, where the one or more instructions to receive the authentication notification include:
  one or more instructions to establish a connection with the client device via another port associated with the PVLAN,
    where the connection enables the client device to communicate with the network via the PVLAN.

16. The non-transitory computer-readable medium of claim 13, where the instructions further comprise:
  one or more instructions to obtain the information associated with the client device based on determining that the client device is connected to the network,
    where the authentication server authenticates the client device based on the response.

17. The non-transitory computer-readable medium of claim 13, where the layer-two authentication protocol is based on an extensible authentication protocol (EAP) or EAP over local area network (EAPOL) protocol.

18. The non-transitory computer-readable medium of claim 13, where the layer-three authentication protocol is based on a remote authentication dial-in user service (RADIUS) protocol.

19. The non-transitory computer-readable medium of claim 13, where the one or more instructions to receive the authentication notification include:
  one or more instructions to process the authentication notification to remove a header or a trailer associated with the layer-two tunneling protocol, and
  one or more instructions to determine that the authentication notification indicates that the client device has been authenticated by the authentication server after removing the header or the trailer.

20. The non-transitory computer-readable medium of claim 13, where the network node acts as a proxy for the client device.

21. The non-transitory computer-readable medium of claim 13, where the one or more instructions to establish the authentication session include:
  one or more instructions to establish the authentication session for a period of time during which the client device is authorized to communicate with the network.

22. The non-transitory computer-readable medium of claim 13, where the one or more instructions to determine that the client device is connected to the network include:
  one or more instructions to enable a port, associated with the network node, that:
    accepts traffic associated with an authentication operation, based on an Institute of Electrical and Electronics Engineers (IEEE) 802.1X standard, and
    drops traffic that is not associated with the IEEE 802.1X standard.

23. The non-transitory computer-readable medium of claim 22, where the one or more instructions to send the indication that the client device is authorized to communicate with the network include:
  one or more instructions to set the port to an authorized state that enables the traffic, that is not associated with the IEEE 802.1X standard, to be processed by the network node.

* * * * *